(No Model.)
J. A. HINDMAN.
DEVICE FOR SECURING ANIMALS.
No. 474,251. Patented May 3, 1892.
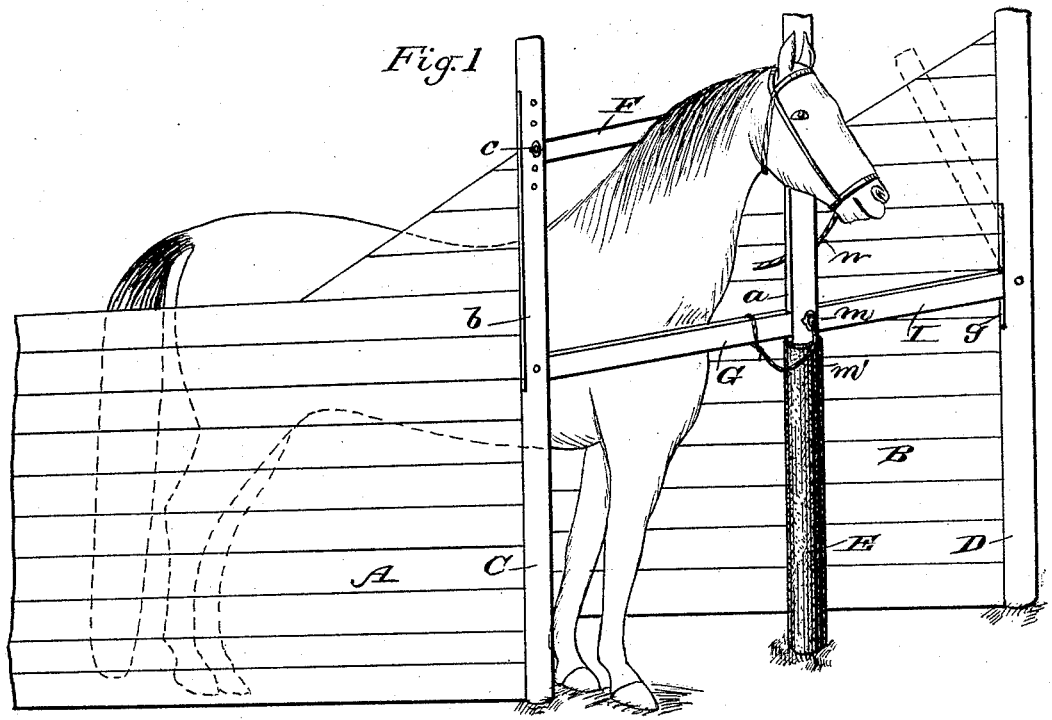
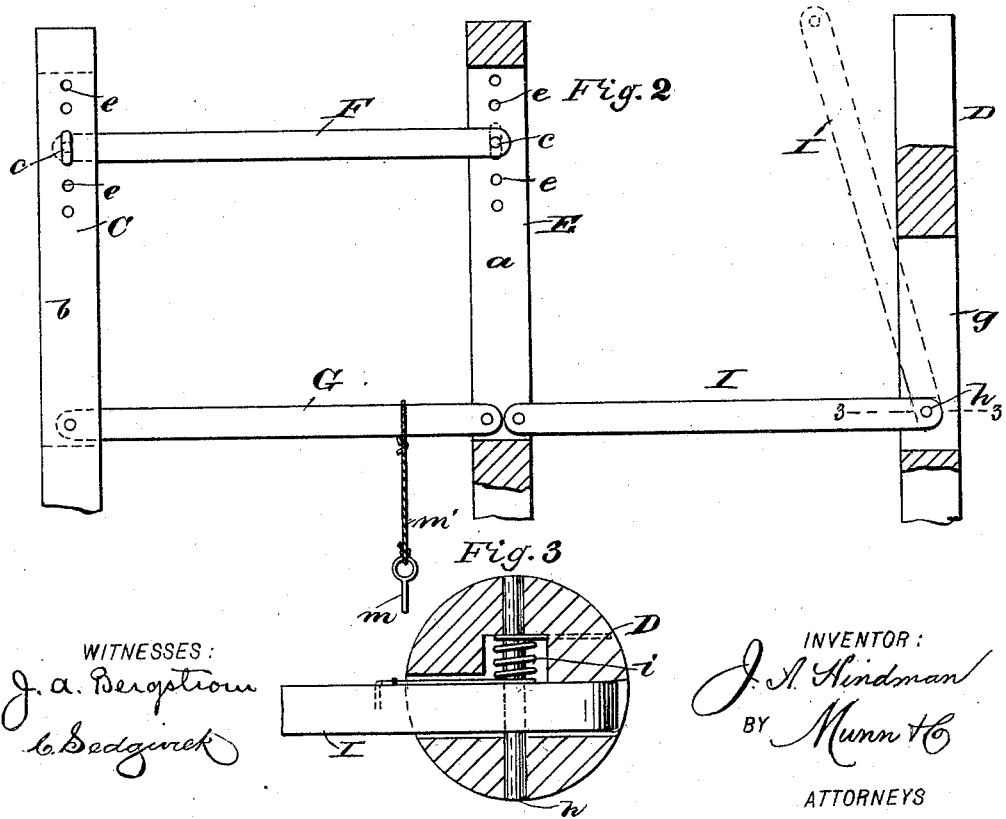
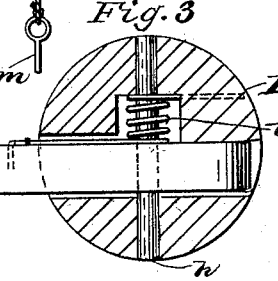
WITNESSES:
J. A. Bergstrom
C. Sedgwick
INVENTOR:
J. A. Hindman
BY Munn & Co.
ATTORNEYS

UNITED STATES PATENT OFFICE.

JOSEPH ANDREW HINDMAN, OF IUKA, ILLINOIS.

DEVICE FOR SECURING ANIMALS.

SPECIFICATION forming part of Letters Patent No. 474,251, dated May 3, 1892.

Application filed November 7, 1891. Serial No. 411,190. (No model.)

*To all whom it may concern:*

Be it known that I, JOSEPH ANDREW HINDMAN, of Iuka, in the county of Marion and State of Illinois, have invented a new and useful Safety Device for Breeding Purposes, of which the following is a full, clear, and exact description.

This invention relates to a novel device for insuring safety to the animals and to the attendant; and it consists in the construction and combination of parts, as is hereinafter described and claimed.

Reference is to be had to the accompanying drawings, forming a part of this specification, in which similar letters of reference indicate corresponding parts in all the figures.

Figure 1 is a perspective view of the device, shown broken away rearward, with a mare in position within the inclosure. Fig. 2 is an enlarged broken and partly sectional front view of the device. Fig. 3 is a cross-section of one part on the line 3 3 in Fig. 2.

In Fig. 1 two side walls A B of a box-stall are shown, which are preferably used in conjunction with the novel features when the service of the male is to be effected within a stable; but if in the open air the walls A B may be dispensed with.

When a stall is utilized, the vertical stanchions C D may be posts of the side walls A B, which latter should be sufficiently separated to receive two horses sidewise and of a length that will allow one animal to turn freely at the rear of the other. Between the stanchions C D a third post E is centrally erected of a proper height and in the same plane with the stanchions, which post is padded a portion of its height from the floor or ground to protect the limbs of the animals from injury if they kick against it. Preferably there is a slot $a$, formed in the post E, which coincides with the plane of a similar slot $b$, formed in one stanchion C for the reception of a top cross-bar F and a lower cross-bar G. The upper cross-bar F is movable in the slots and securable at a desired point by the insertion of transverse bolts or pins $c$ through holes $e$, that are formed at equal intervals of height in the stanchion and center post, said bolts passing through a hole in each end portion of the cross-bar F that may be aligned with any of the holes $e$. The height of the lower cross-bar G from the ground or floor of a stall is so proportioned to the height of horses that the breast of a mare of ordinary height will rest against it when the animal's head is caused to project between the lower and upper cross-bar, as represented in Fig. 1. Said lower cross-bar is pinned or otherwise securely fastened in place, and for effective service should be strong enough to withstand forcible pressure laterally applied. There is a gate-bar I provided, which is of the same dimensions as the bar G, to insure strength, one end of the gate-bar being pivotally supported in a slot $g$, formed in the stanchion D by a transverse bolt $h$, there being a coiled spring $i$ mounted on the bolt, as shown in Fig. 3, having its ends attached to the gate-bar and stanchion named, the tensional force of the spring causing a quick elevation of the gate-bar when the latter is unrestrained. The gate-bar I is preferably caused to align with the lower cross-bar G when it is given a horizontal position.

A simple and effective means for detachably retaining the free end of the gate-bar within the slot $a$ of the post E, as shown, consists of a pin $m$, that is secured to a cord $m'$ at one end and therewith suspended from the fixed cross-bar G, said pin being inserted into aligning holes formed in the end portion of the bar I and in the opposite walls of the slotted post E when it is desired to adjust the gate-bar, so as to form a barrier across the space between the center post and the stanchion D.

When the safety device is to be used, the mare is placed, as indicated in Fig. 1, with her head and neck projected between the upper and lower cross-bars F G. The attendant leads the stallion up to the mare, allowing their heads to come together, and subsequently releases the gate-bar fastening, so that said bar flies upward into the position shown in dotted lines, Figs. 1 and 2, thus permitting the stallion to pass alongside the mare rearward. The attendant follows and at the same time draws the mare's halter-strap $n$ taut around the center post E, in front of which he takes his position. The top cross-bar F restrains the stallion from attempting to leap over the lower cross-bar G.

Having thus described my invention, what I claim as new, and desire to secure by Letters Patent, is—

1. In animal-securing devices, the combination, with two side supports, of an intermediate post, a top cross-bar between one side support and the post, a lower cross-bar, and a gate-bar that is movable and bars the space between the post and the other side support, substantially as described.

2. In animal-securing devices, the combination, with two spaced side supports and an intermediate upright post, of a fixed horizontal cross-bar and a movable gate-bar that aligns with the cross-bar, substantially as described.

3. In animal-securing devices, the combination, with two spaced stanchions and an intermediate upright post, of an adjustable top cross-bar and a lower cross-bar engaging one stanchion and the post and a spring-pressed gate-bar that may be held in alignment with the lower cross-bar or be released and rise by pressure of the spring, substantially as described.

4. In animal-securing devices, the combination, with two spaced upright stanchions, one being longitudinally slotted a part of its length above and a center post slotted to mate the slot in the stanchion, of a vertically-movable cross-bar above on the post and stanchion secured by its ends in the slots, a lower cross-bar having its ends held in said slots of the post and stanchion, and a gate-bar pivoted on the other stanchion so that its free end may lie in the post-slot aligned with the lower cross-bar, a removable pin to hold the gate-bar depressed, and a spring adapted to rock said gate-bar upwardly when it is released from the post, substantially as described.

JOSEPH ANDREW HINDMAN.

Witnesses:
F. N. SANGER,
A. J. HOLADAY.